J. I. SHAFER.
Grain Winnower.
No. 33,009.
Patented Aug. 6, 1861.
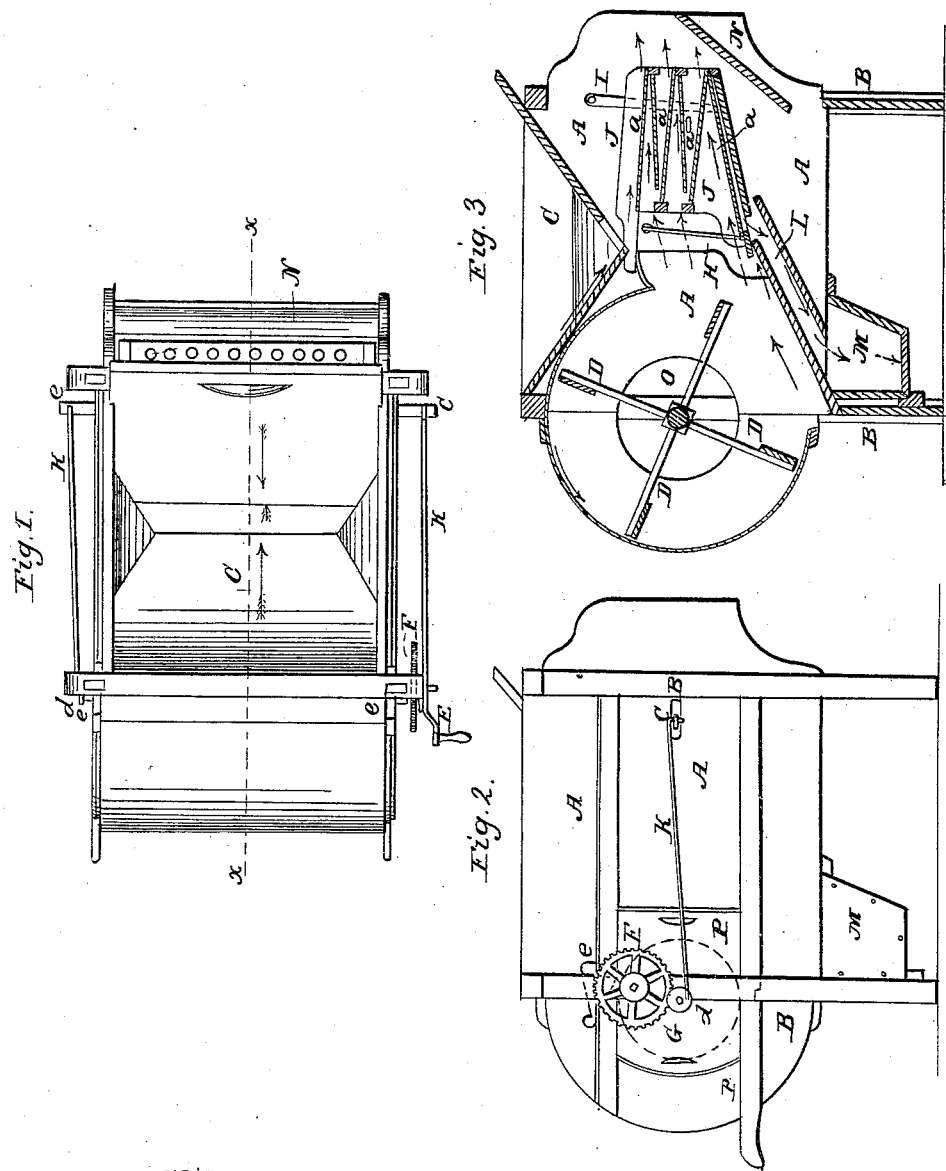

UNITED STATES PATENT OFFICE.

JAMES I. SHAFER, OF BURLINGTON, IOWA, ASSIGNOR TO R. I. ROBESON, OF SAME PLACE.

GRAIN-WINNOWER.

Specification of Letters Patent No. 33,009, dated August 6, 1861.

*To all whom it may concern:*

Be it known that I, JAMES I. SHAFER, of Burlington, Des Moines county, Iowa, have invented certain new and useful Improvements in Fan-Mills or Grain-Separators; and I do hereby declare that the following is a full, clear, and exact description thereof, reference being had to the accompanying drawings, which form a part of this specification, and in which—

Figure 1 represents a plan or top view of the machine; Fig. 2, a side view; Fig. 3, a longitudinal section on line $x$, $x$, of Fig. 1.

It has been found difficult to separate oats, black weed and other similar substances, which are to be found in wheat, and the object of this invention, is, to effect this result, especially in spring wheat.

In the drawings—A, represents the sides of the box, which with the supporting legs or timbers B, may be termed the frame, and within which is arranged the operating mechanism which cleans the wheat. The wheat after having been cleaned of chaff, is to be placed in the receiving box C, through which, it descends upon the first perforated zinc screen $a$; which inclines downward as it projects forward. After the box C, has been supplied with a suitable quantity of wheat, motion is communicated to fan wheel D, by means of crank E, on the journal of gear F, or, it may be driven by gearing or belts, applied in any proper manner.

As gear F, revolves, it causes the small gear G, on the end of the fan shaft to revolve, thus giving the fan a very rapid motion, whereby the wind is forced downward in the direction of the red arrows. The wind however, instead of being allowed to pass directly forward, through the falling wheat, is deflected upward, by the return boards or ways $b$, $b$, $b$, which are tight and smooth, and made to pass up through the holes in the screen next above, before it can pass out. This is fully illustrated by red arrows.

The frame which supports the screens and return boards or ways, is suspended by two swinging arms H, in rear, and two others I, in front, one of each being shown in Fig. 3. The other two occupy corresponding positions on the other side of the machine. These arms are attached at top to supports, fastened to the inner side of the frame or side boards, and the bottom to the edge of the sides J, of the riddle or screen frame.

A rod $c$ is passed through the sides J and extends on each side of the main frame or box of the machine, and to the ends, so extending and hooked or otherwise fastened to the front ends of rods or connections K, their ends being slipped in eccentric holes in wheels $d$, on the ends of the fan shaft. Instead however, of being hooked into holes in wheels $d$, they might be provided with holes to fit on crank pins in the sides of said wheels $d$. At every revolution therefore of the fan shaft, a back and forward motion will be given to the screen frame and screens.

It will be seen that the motion of the screens is short and rapid, which, in combination with the upward currents of air through the holes in the screens $a$, causes lighter substances, in the wheat, such as oats to be lifted or held up, and finally delivered in front of the screens, while the wheat being much heavier, falls, through the holes in the first screen, and is then allowed to run back upon the first inclined return board or way $b$, from the rear of which, it falls upon the next screen, as fully indicated by black arrows in Fig. 3.

In the construction of the machine it may be found convenient to make the return boards or ways of metal; the material, will of course be at the option of the constructor. In this instance the bottom one is made of wood and from which the wheat descends back, into the spout or way L, which conducts it into a box or receptacle M, which is so arranged as to slide from either side of the machine, for examination, or to be emptied. The screens $a$, are made so that they can be drawn out in front,—(rods $f$, being first removed)—and others put in their place.

For cleaning corn and chaffing wheat and other substances, wire sieves may be used.

The front of box C is made to slide up and down in side grooves or ways to graduate the opening at the bottom. The front board N, is also so made that it can be drawn out. The fan case can also be taken out, by simply pushing back wedges $e$. The opening $o$, on each end of the fan box, can be entirely closed, if desired as seen in Fig. 2, by means of the slides P, one on each side of the upright timber of the frame.

Having described my improvements, what I desire to claim and secure by Letters Patent, is—

1. The screens $a$, and return boards $b$, in combination with the direct fan blast through the screens, when arranged as and for the purposes set forth.

2. The combination of the short, uniform shake with the mode of applying the currents of air to the grain, substantially as described.

In witness whereof I have hereunto subscribed my name.

JAMES I. SHAFER.

In presence of—
J. E. Dow,
C. Marble.